(No Model.)
W. H. JONES.
HAND RAKE.
No. 324,940. Patented Aug. 25, 1885.
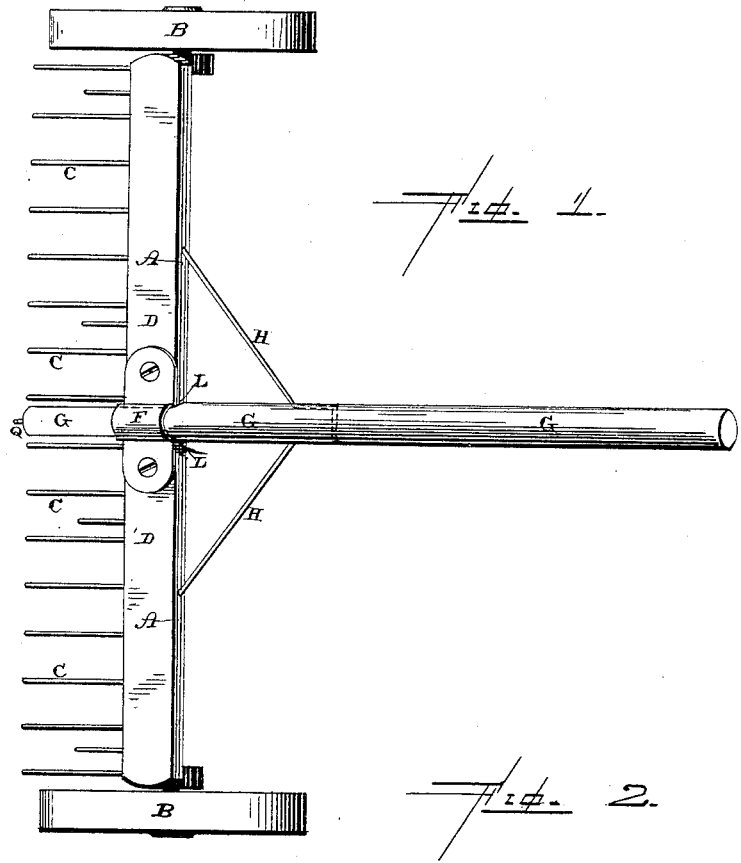
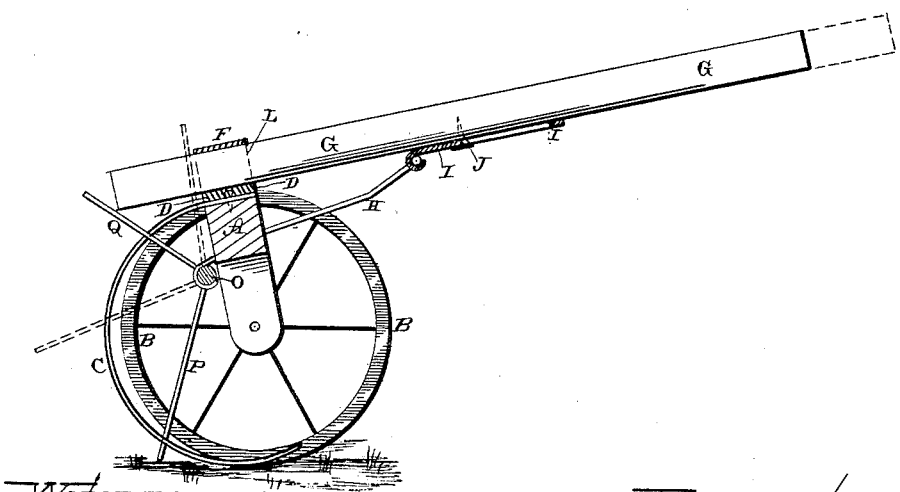
Witnesses.
R. P. Gardner
L. L. Burket
Inventor-
W. H. Jones,
per F. A. Lehmann, atty

UNITED STATES PATENT OFFICE.

WILLIAM H. JONES, OF LIBERTY, INDIANA.

HAND-RAKE.

SPECIFICATION forming part of Letters Patent No. 324,940, dated August 25, 1885.

Application filed July 15, 1885. (No model.)

*To all whom it may concern:*

Be it known that I, WILLIAM H. JONES, of Liberty, in the county of Union and State of Indiana, have invented certain new and useful Improvements in Hand-Rakes; and I do hereby declare the following to be a full, clear, and exact description of the invention, such as will enable others skilled in the art to which it pertains to make and use it, reference being had to the accompanying drawings, which form part of this specification.

My invention relates to an improvement in hand-rakes; and it consists in the combination of a suitable axle or head to which the rake-teeth are fastened, wheels for moving the rake backward, a sliding handle, and a cleaning device for the teeth, which is operated by the handle, all of which will be more fully described hereinafter.

The object of my invention is to provide a rake with wheels, so that it can be rolled backward, instead of being raised upward and carried back by hand, and to operate the cleaning device by means of the handle while the rake is being forced backward ready for another forward movement.

Figure 1 is a plan view of a rake embodying my invention. Fig. 2 is a vertical section of the same, the handle and the cleaning device being shown in one position in solid lines and in another position in dotted lines.

A represents the head or axle, which may be of any desired length and construction that may be preferred, and which is supported at each end by means of a wheel, B, which will be of a size proportioned to the rake-teeth which are used. The axles of these wheels are dropped down below the under side of the axle A, as shown, so as to enable a smaller and a lighter wheel to be used. The rake-teeth C may either be secured to the top edge of the axle by means of a cleat, D, which is secured upon the axle, or upon the tops of their upper ends. Secured upon the top of this cleat is a guiding-loop, F, through which the rear end of the sliding handle G passes, and secured to the front side of the axle is a suitable brace or support, H, which has the slotted link or slide I secured to its front end. Through the slot in this plate is passed a suitable set-screw, J, which both secures the plate to the handle and serves to limit the outward movement of the handle when the rake is drawn forward. The backward movement of the handle may be limited by the shoulders L upon the handle, and which strike against the front edges of the guiding-loop, or by the slot. This handle is given a sliding movement for the purpose of operating the cleaning device, which serves to free the teeth of the rake from any substance which may adhere to them when the rake is in use. These cleaning devices consist of a partially-rotating rod, O, which is hung upon the under side of the axle, and which is provided with a series of arms, P, which extend outward through the rake-teeth, and with the lever Q, which is long enough to project upward above the inner end of the handle, by which it is to be struck for the purpose of operating the arms to clean the teeth.

When the rake is drawn forward, and the teeth gather a quantity of grass or any other substance, this substance presses these arms backward as it rises upward upon or in front of the lower ends of the rake-teeth. As the arms are forced backward and upward by the substance which is being raked, the rod O is turned correspondingly around, and the lever is raised upward, so that its upper end will be struck by the backward movement of the handle when the rake is forced backward to gather another load. In case any of the substance should adhere to the teeth when these arms are forced downward and forward by the backward movement of the handle, the substance will be forced off from the teeth, so as to leave them entirely clear. When the rake is standing free, these arms project downward just in front of the lower ends of the rake-teeth, and are only forced backward and upward in proportion to the amount of substance which is covered.

Having thus described my invention, I claim—

1. The combination of the hand-rake provided with wheels, the sliding handle, and a device for cleaning the teeth, substantially as described.

2. The combination of a hand-rake with a sliding handle, which is connected thereto, and a cleaning device the arms of which are moved in one direction by the substance being raked and in the other direction by means of the handle, substantially as set forth.

3. The combination of a hand-rake with a cleaning device, which consists of a shaft which is secured to the under side of the rake head or axle, arms for cleaning the teeth, and a lever for forcing the arms downward, substantially as specified.

4. The combination of a hand-rake, a sliding handle, a sliding plate which is secured to the handle, a guiding-loop upon the rake-head of the axle, and a cleaning device which is operated by the sliding movement of the handle for the purpose of cleaning the teeth, substantially as shown and described.

In testimony whereof I affix my signature in presence of two witnesses.

WILLIAM H. JONES.

Witnesses:
 JAS. A. DRIGGS,
 EDWARD WEBSTER.